(12) United States Patent
Hutt

(10) Patent No.: US 9,512,938 B2
(45) Date of Patent: Dec. 6, 2016

(54) METHOD OF FORMING A COLLAR ON A TUBULAR COMPONENT THROUGH DEPOSITING OF WELD METAL AND MACHINING THIS DEPOSIT INTO A COLLAR

(71) Applicant: Pipeline Technique Limited, Rothienorman (GB)

(72) Inventor: Graham Hutt, Nizas (FR)

(73) Assignee: Pipeline Technique Limited, Rothienorman (GB)

( * ) Notice: Subject to any disclaimer, the term of this patent is extended or adjusted under 35 U.S.C. 154(b) by 0 days.

(21) Appl. No.: 14/519,372

(22) Filed: Oct. 21, 2014

(65) Prior Publication Data

US 2015/0110562 A1   Apr. 23, 2015

Related U.S. Application Data

(60) Provisional application No. 61/893,725, filed on Oct. 21, 2013.

(51) Int. Cl.
| | |
|---|---|
| *F16L 1/19* | (2006.01) |
| *B23K 9/04* | (2006.01) |
| *F16L 1/20* | (2006.01) |

(52) U.S. Cl.
CPC .................. *F16L 1/19* (2013.01); *B23K 9/048* (2013.01); *F16L 1/207* (2013.01)

(58) Field of Classification Search
CPC ..................................... F16L 1/19; F16L 13/02
See application file for complete search history.

(56) References Cited

U.S. PATENT DOCUMENTS

| | | | |
|---|---|---|---|
| 2,491,878 | A | 12/1949 | Spagnola |
| 2,813,190 | A | 11/1957 | Felmley |
| 4,409,466 | A | 10/1983 | Commeau |
| 4,521,664 | A | 6/1985 | Miller |
| 4,857,693 | A | 8/1989 | Rump |
| 5,098,007 | A | 3/1992 | Tsuruda et al. |

(Continued)

FOREIGN PATENT DOCUMENTS

CN   1759979 A   4/2006

OTHER PUBLICATIONS

Jeggy, Thierry, "International Search Report", for PCT/GB2008/051229 as mailed Apr. 17, 2010, 5 pages.

(Continued)

*Primary Examiner* — Benjamin Fiorello
(74) *Attorney, Agent, or Firm* — Winstead PC

(57) ABSTRACT

A method of laying a pipeline comprising a plurality of tubular components is disclosed. The method includes depositing a weld material onto a surface of a first tubular component of the plurality of tubular components and machining a profile into the weld material. The profile includes a support shoulder into the weld material. The method further includes suspending the first tubular component in a vertical or near vertical position and supporting the first tubular component by the support shoulder. A further tubular component of the plurality of tubular components is connected to a free end of the first tubular component. The support shoulder is formed at a point spaced from the free end of the first tubular component thereby facilitating connection of the first tubular component to the second tubular component.

7 Claims, 2 Drawing Sheets

(56) References Cited

U.S. PATENT DOCUMENTS

| | | | |
|---|---|---|---|
| 5,207,371 A | 5/1993 | Prinz et al. | |
| 5,362,937 A | 11/1994 | Browne et al. | |
| 5,837,960 A | 11/1998 | Lewis et al. | |
| 6,179,523 B1 | 1/2001 | Langner et al. | |
| 6,627,839 B1 | 9/2003 | Luckowski et al. | |
| 7,832,484 B2 * | 11/2010 | Nguyen | E21B 36/04 166/242.4 |
| 2001/0033773 A1 | 10/2001 | Baugh | |
| 2011/0127315 A1 | 6/2011 | Hutt | |
| 2014/0048585 A1 | 2/2014 | Hutt | |

OTHER PUBLICATIONS

Database WPI Week 200671, Thomson Scientific, London, GB; AN 2006-680953, XP002522256, 1 page.

* cited by examiner

METHOD OF FORMING A COLLAR ON A TUBULAR COMPONENT THROUGH DEPOSITING OF WELD METAL AND MACHINING THIS DEPOSIT INTO A COLLAR

CROSS-REFERENCE TO RELATED APPLICATIONS

This patent application claims priority to, and incorporates by reference, U.S. Provisional Patent Application No. 61/893,725, filed Oct. 21, 2013. This patent application incorporates by reference the entire disclosure of U.S. patent application Ser. No. 12/918,716, filed Dec. 23, 2008.

FIELD OF THE INVENTION

The present invention relates to a method of forming a collar on a tubular component. More specifically, the invention relates to a method of forming a collar on a pipe to assist in supporting the pipe during installation. The present invention finds particular application in relation to collars provided on pipes for use in supporting the pipe from a floating vessel or platform when the pipe is being laid on the seabed.

BACKGROUND

Fluids are commonly transported across large distances through pipelines formed of discrete pipe sections connected together end to end. In the transportation of hydrocarbons between off-shore facilities and on-shore processing plats, the pipelines can extend for many hundreds or in some cases thousands of miles. Before any fluids can be transported, the pipeline must be laid across the seabed.

One known system of pipe laying which is commonly employed in the construction of deepwater pipelines or riser systems is a J-laying method. Lengths of pipe are stored on a floating vessel. The pipeline is supported in a vertical or near vertical orientation on the vessel and extends from the vessel to the seafloor where it rests on the seabed. Each new pipe is transferred into a vertical orientation where it is welded onto the top-most pipe and the pipe string is lowered to bring the top of the new pipe into position for connection of a further pipe. In this system a mechanical device is incorporated for restraining the tension in the pipe catenary between the lay ship and the seabed.

Due to the very high tensions encountered in deepwater pipe laying, it is often necessary to provide a raised shoulder on the pipe end to be supported by the restraining device to prevent slippage. It is customary to use so-called J-lay collars for this purpose and typically these are machined from a forging or heavy wall section of pipe and then welded to the pipe to be supported. The collar supports the weight/tension in the pipe between the installation ship or platform and the seabed.

Since the J-lay collars remain as permanent items on the completed pipeline, they must conform to specified metallurgical, mechanical and structural integrity requirements that are similar or exceed to the pipeline material itself.

Attainment of these desired properties can be problematic and particularly when very heavy wall thickness, high strength and/or special corrosion resistant alloy materials are needed.

SUMMARY

The present invention aims to provide a method of forming a surface profile on a tubular component which addresses this problem.

In other situations, a carbon steel pipe material may be metallurgically or mechanically lined with a corrosion resistant alloy (CRA) to provide protection against the fluids in the pipeline. In such cases, the J-lay collars need to be similarly protected by applying a compatible CRA material to the inside surface in the form of a welded overlay. The irregular penetration and fusion profile of the overlay can give rise to difficulties when performing non-destructive testing of the circumferential weld used to connect the j-lay collar and the pipe.

It is therefore an object of the present invention to provide a method of forming a surface profile on a tubular component which also addresses this problem.

According to one aspect of the present invention there is provided a method of forming a collar on a tubular component, said method comprising the steps of depositing a weld metal onto the surface of the tubular component and machining the collar into the weld material and machining a support shoulder into the collar to facilitate suspension of the tubular component.

By machining the collar directly into weld material deposited onto the surface of the tubular component, a separate J-Lay collar is not required. Such a collar would normally be welded onto the end of a pipe and therefore this can reduce the equipment which is needed on board a pipe laying vessel which represents a significant cost, time and weight saving.

Preferably the weld metal is deposited onto the surface of the pipe by a direct deposition operation.

By directly depositing the weld material onto the surface of the pipe, one circumferential girth weld can be eliminated in the pipeline and this improves the quality and reliability of the pipeline. Thus, where multiple pipes are being laid into the pipeline and a circumferential weld is eliminated in each pipe length, the improvements over the entire length of the pipeline is significant.

Furthermore, where the material is deposited onto a relatively short section of pipe, i.e. a 12 m length of pipe, which is then cut into smaller lengths, this makes the transport and handling of the collar pieces easier whilst keeping the advantage over a traditional forged collar because all of the circumferential welds are pipe to pipe material with no pipe to forging welding procedures having to be qualified.

Advantageously, the weld metal is deposited onto the pipe in a specified deposition sequence.

This allows the characteristics of the surface profile to be closely controlled by the user and means that different J-Lay collars having different material characteristics need not be carried on board the pipe laying vessel.

The deposit weld metal and welding method can be selected to give specified technological properties in the deposit without causing unacceptable degradation of the parent material.

According to one embodiment of the invention, the deposit is made by rotation or translation of the tubular component past a welding head.

Alternatively the deposit is made by rotation or translation of a welding head past the tubular component.

In some embodiments a combination of rotation or lateral translation of the tubular component and/or the welding head may be used.

BRIEF DESCRIPTION OF THE DRAWINGS

One embodiment of the invention will now be described with reference to the attached drawings in which.

DETAILED DESCRIPTION

Figure 1:
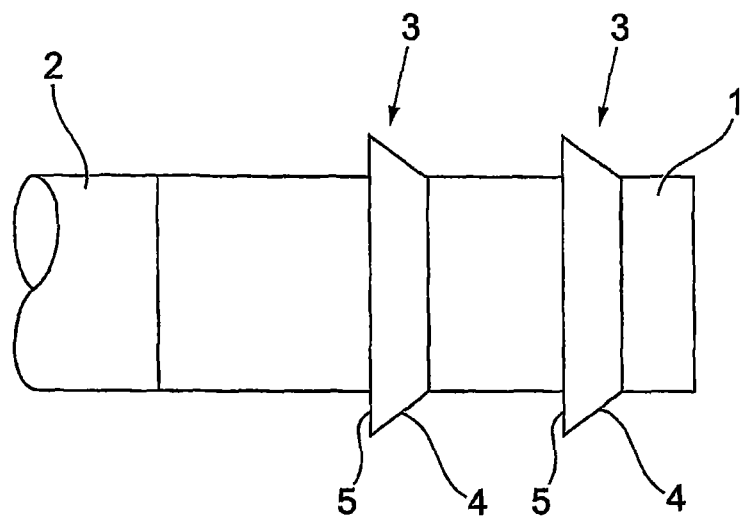
FIG. 1 is a schematic side view of a typical J-Lay collar welded to the end of a pipe.

Turning now to the drawings, FIG. 1 shows a schematic side view of a typical J-Lay collar 1 which is welded to the free end of a pipe 2. The collar 1 generally comprises a section of pipe having substantially the same diameter as the pipeline to which it is to be welded but having a shorter length.

In the example illustrated, two profiles 3 are provided on the collar. Each profile comprises an outwardly flared flange 4 which terminates in a shoulder 5 via which the collar can be supported in a vertical position.

The present invention provides a means of developing the required geometric profile to enable a pipe to be supported in a vertical or near vertical position during a laying operation. This is achieved by direct deposition of weld metal onto the surface of the pipe in a specified location and deposition sequence.

The position of the profile is selected and weld material is deposited circumferentially around the surface of the pipe. The amount of material deposited is selected to ensure that the resulting deposition has sufficient dimensions as to fully encapsulate the desired profile on the pipe.

The deposit may be made by any combination of rotation or lateral translation, of the pipe or welding equipment to develop the desired deposition pattern. For example, in one embodiment, a pipe may be rotated and/or translated past a static welding head. In an alternative embodiment, the pipe may be held static and the welding head may be translated and/or rotated past the static pipe. As a further alternative, both the pipe and the welding head may be translated and/or rotated with respect to one another.

The welding equipment may comprise one or more welding heads operating simultaneously or in a synchronised pattern to increase the rate of deposition.

An expandable and/or water cooled mandrel may be located in the bore of the tubular component to increase the rate of heat abstraction. This may assist to prevent overheating of the tubular component and allow for continuous welding to be carried out. Such an expanding mandrel may also be adapted to apply a radial force internally of the tubular component in order to resist distortion and shrinkage of the bore of the tubular component.

The location in which weld material is deposited onto the pipe will be a factor in determining which embodiment is preferred. For example, on a pipe laying vessel where space may be at a premium, the most compact deposition operation will be used. Alternatively, in an on-shore facility where additional space is available, different considerations will affect the selection of deposition method.

Once the deposition is complete, the required profile is machined out of the deposited material using a known process. Machining may for example include any metal removing or shaping technique or any grinding technique for forming the profile on the surface of the tubular component.

Figure 2:
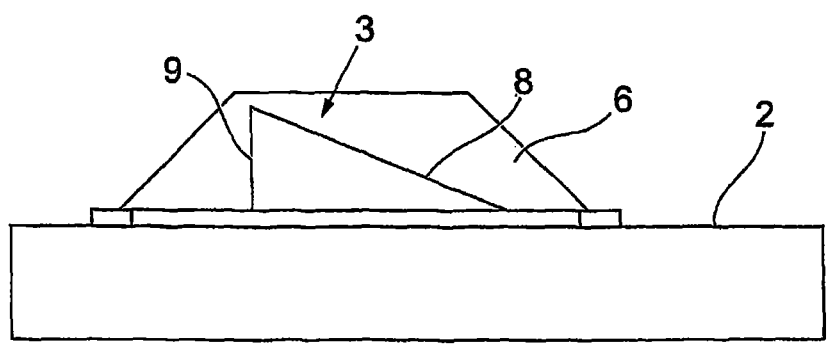
FIG. 2 is a schematic side view of a profile to be machined on a tubular component in accordance with one aspect of the method of the present invention.

FIG. 2 is a schematic cross-sectional view of a length of pipe 2 upon which weld material 6 has been deposited to a sufficient depth around the outer surface of the pipe to encapsulate the desired profile on the pip. In this embodiment, the collar comprises an outwardly flared flange 8 which terminates in a shoulder 9 via which the resulting profile can be used to support the pipe in a vertical or near vertical position.

The so produced geometric form may be machined (from the near net shape) to a more precise profile if required.

Preferably the collar is formed at a point spaced from the end of the pipe to be installed in the pipeline thus eliminating the need for a separate j-lay collar having the appropriate profile formed thereon to be welded onto the end of the pipe before installation. Typically the collar may be formed at least around 250 mm from the end of the pipe. This provides for connection of the pipe to a subsequent pipe by a girth weld at each end and maintains sufficient pipe length for inspection of the girth weld. In the event that the weld is rejected, this also provides for some leeway in cutting out material to replace the weld.

However, the method may also be applied to sub-components such as for example pipe fittings or forgings to be subsequently attached to the pipe.

FIG. 2 shows a pipe with a single profile formed on the outer surface thereof. It will of course be appreciated that as the method of the present invention does not require casting of the profile onto the surface of the pipe, any number of profiles may be provided on a pipe. In some embodiments, different profiles may be machined onto a length of pipe to perform different functions or to provide different properties to the pipe.

The method can be applied to any suitable substrate material including but not limited to carbon steel or CRA in wrought, forged, extruded or cast form.

The deposit can be applied to a pipe or sub-component that already has an internal CRA layer or lining thus avoiding the need to overlay the inner surface as a separate operation. The characteristics of such existing layers or linings may be selected to be more favourable for inspection of subsequent circumferential welds.

The deposit may be made using any weldable pipe or sub-component materials in wrought, cast, forged, seam welded or seamless tubular form. Such materials may be in solid or have an internal layer or lining of CRA.

The deposit may be made by any suitable means of fusion and weld metal deposition process One important advantage of the present invention over the use of forged components is that the deposit can be made at any required position along the length of the pipe which allows for a variety of configurations to suit different applications which would be difficult to cover using traditional forgings due to the cost implications of providing the requisite tooling.

The deposit may be made using any suitable welding consumable(s) deposited in individual weld runs or layers with a single type/classification of consumable per run or layer or a mixture of consumables to develop specific technological properties.

Furthermore, as the deposit material is not required for connection of the pipes, and is not exposed to the pipeline contents, it can be formed from a material for structural/load bearing purposes independent of the function of fluids to be carried by the pipeline.

It is envisaged that the method of the present invention may be operated on a pipe laying vessel wherein lengths of pipe are transported to the appropriate position for connection into an existing pipeline and the require profile is formed onto the surface of the pipe on board the vessel. In this case the vessel would carry both the weld deposition apparatus and also the machining apparatus for form the required profile on the surface of the pipe locally.

The deposit can be applied to the plain surface of a pipe or tubular component or to modify any features pre-formed by forging and/or machining of the pipe. Therefore the present invention also enables the existing profile of a tubular member to be modified so that if the requirements of the profile change at different times during the pipe laying procedure, the profile of subsequent tubular components can be modified on board a pipe laying vessel to accommodate the changing requirements of the profile.

Alternatively, the method of the present invention may be operated in an on-shore facility such that the required profile is formed onto the surface of the pipe before the pipe is transported onto the pipe laying vessel. In this case, additional machining apparatus may be carried on the vessel such that fine adjustment of the profile can be made at the point of installation.

The present invention finds particular application in the field of pipeline laying and particularly in J-Lay operations where a pipeline is suspended in the water from a surface vessel or platform and extends to the sea bed where it is laid along a selected route. However, it will be appreciated that the invention may also be applicable in any field where a surface profile is desired.

It will be appreciated that the Jlay collar is intended to remain on the pipeline after laying. Where a forged component is welded to the pipe such as a traditional Jlay collar, this collar must meet the same technological requirements of the pipeline in terms of mechanical properties and corrosion performance, For very high specification pipeline designs, these technical requirements may be beyond the capability of commonly available forging materials. This problem is solved by the present invention by directly depositing the weld material onto the surface of a high specification pipe without degrading its properties and avoiding the need for different components to be welded to the end of the pipe.

Furthermore, changes in size and design of the machined collar can be affected more rapidly that by using a traditional forging. For different parts of the pipeline, different collar sizes are used simply by adjusting the number of layers deposited on top of one another. If a pipeline runs in different water depths, the collar size can be adjusted easily. Even for initial build up part of the pipeline, smaller collars could be produced.

Using traditional forgings, the mould is generally too costly to do so it proves more economical to make all collars to suit the highest loads for the whole pipeline, which means all but one collar will be over dimensioned. The direct deposit collar manufacturing can thus optimize material use and production time.

Additionally, forged collars are typically formed as a cylinder from which the final collar shape is machined. This means that a lot of material is wasted in the production process but also a lot of energy is used to heat the material which is then removed. The direct deposit method optimizes the material and energy consumption.

Further applications of the method include other pipeline components that require locally increased wall thickness or specific geometric forms such as for example buckle arrestors or hang-off collars.

The invention may also be used to form surface features on a tubular component. For example, the surface of the tubular component may be textured or serrated to enhance gripping in a restraining device or bonding of protective paint and coatings to the outer surface of the tubular component.

Pipelines often require buckle arrestors to be included, typically every 2 to 3 kilometers. Using a direct deposit method as described above, the majority of the collars can be optimized to carry the pipeline load, and only where required, additional layers can be deposited to create a buckle arrestor.

Figure 3:
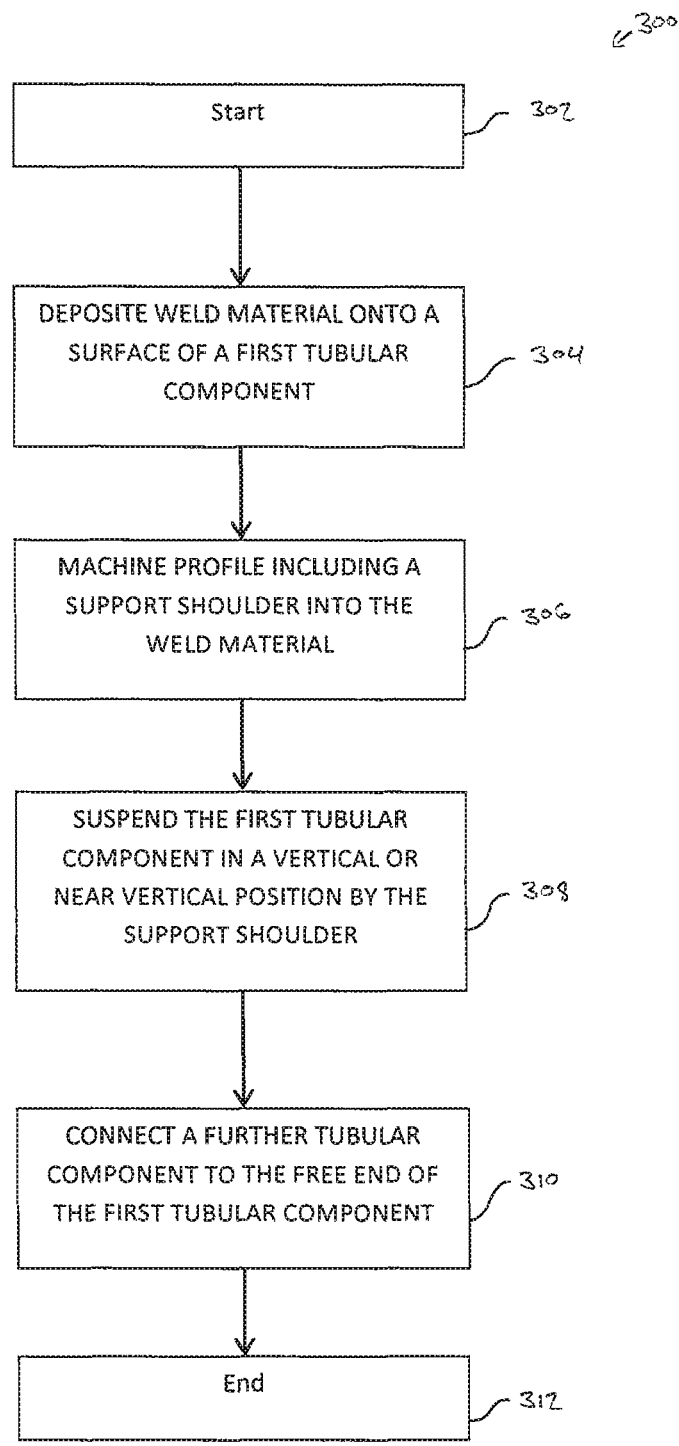
FIG. 3 is a flow diagram illustrating a process for laying a pipeline comprising a plurality of tubular components.

FIG. 3 is a flow diagram illustrating a process 300 for laying a pipeline comprising a plurality of tubular components. The process 300 begins at step 302. At step 304, a weld material is deposited onto a surface of a first tubular component. At step 306, a profile, including a support shoulder, is machined into the weld material. At step 308, the first tubular component is suspended in a vertical or near vertical position by the support shoulder. At step 310, a further tubular component is connected to a free end of the first tubular component. The process 300 ends at step 312.

What is claimed is:

1. A method of laying a pipeline comprising a plurality of tubular components, the method comprising:
    depositing a weld material onto a surface of a first tubular component of the plurality of tubular components;
    machining a profile into the weld material, the profile including a support shoulder;
    suspending the first tubular component in a vertical or near vertical position and supporting the first tubular component by the support shoulder;
    connecting a further tubular component of the plurality of tubular components to a free end of the first tubular component;
    wherein the profile does not contact fluids within the first tubular component thereby facilitating the weld material having properties different from the first tubular component; and
    wherein the support shoulder is formed at a point spaced from the free end of the first tubular component thereby facilitating connection of the first tubular component to the further tubular component.

2. The method according to claim 1, wherein, in the step of depositing the weld material, multiple welding heads are operated simultaneously on the surface.

3. The method according to claim 2, wherein the weld material is deposited in a position spaced from ends of the pipe.

4. The method according to claim 1, wherein the weld material is deposited in a position spaced from ends of the pipe.

5. The method according to claim 1, wherein the profile forms a collar on the first tubular component.

6. The method according to claim 1, wherein the further tubular component is welded to the first tubular component.

7. The method according to claim 1, wherein the depositing comprises rotating the first tubular component relative to a weld head.

* * * * *